US012594867B2

(12) United States Patent
Cauquil et al.

(10) Patent No.: US 12,594,867 B2
(45) Date of Patent: Apr. 7, 2026

(54) DEVICE FOR ATTACHING A TUBE ONTO A HOLDER

(71) Applicant: SAFRAN SEATS, Plaisir (FR)

(72) Inventors: Samuel Cauquil, Moissy Cramayel (FR); Pascal Beving, Moissy Cramayel (FR)

(73) Assignee: SAFRAN SEATS, Plaisir (FR)

( * ) Notice: Subject to any disclaimer, the term of this patent is extended or adjusted under 35 U.S.C. 154(b) by 504 days.

(21) Appl. No.: 18/254,938

(22) PCT Filed: Nov. 22, 2021

(86) PCT No.: PCT/FR2021/052057
§ 371 (c)(1),
(2) Date: Oct. 12, 2023

(87) PCT Pub. No.: WO2022/112698
PCT Pub. Date: Jun. 2, 2022

(65) Prior Publication Data
US 2024/0042908 A1 Feb. 8, 2024

(30) Foreign Application Priority Data
Nov. 30, 2020 (FR) ...................................... 2012416

(51) Int. Cl.
*B60N 2/68* (2006.01)
*F16B 2/06* (2006.01)
*F16B 35/06* (2006.01)

(52) U.S. Cl.
CPC .............. *B60N 2/682* (2013.01); *F16B 2/065* (2013.01); *F16B 35/06* (2013.01)

(58) Field of Classification Search
CPC .... F16B 2/06; F16B 2/065; F16B 2/08; F16B 35/06; F16B 3/08; F16B 7/04
See application file for complete search history.

(56) References Cited

U.S. PATENT DOCUMENTS 2,303,309 A * 11/1942 Mcarthur ................ F16B 12/40
403/191
4,373,235 A * 2/1983 Korgaonkar ............ F16L 23/04
24/282

(Continued)

FOREIGN PATENT DOCUMENTS

GB 560 154 A 3/1944
GB 2 200 401 A 8/1988

(Continued)

OTHER PUBLICATIONS

International Search Report as issued in International Patent Application No. PCT/FR2021/052057, dated Feb. 16, 2022.

*Primary Examiner* — Daniel J Wiley
(74) *Attorney, Agent, or Firm* — CUSHMAN PARTNERS

(57) ABSTRACT
A device for attaching a tube onto a holder includes the tube, the holder, a through screw and a nut, the holder receiving the tube in a cylindrical housing transversely pierced by a port, the tube having two piercings facing each other, the screw passing through the port and the two piercings and securing the tube and the holder, wherein the cylindrical housing of the holder has a longitudinal slot facing the port, the slot having two inner edges disposed on the side of the housing and two outer edges disposed on the side opposite the housing, the nut including at least one inclined face, each outer edge having a bell crank cooperating with the inclined face of the nut.

10 Claims, 4 Drawing Sheets

(56)     References Cited

U.S. PATENT DOCUMENTS

| 4,507,105  A  * | 3/1985 | Stottmann .................. F16B 2/08 |
| | | 74/609 |
| 5,553,923  A  * | 9/1996 | Bilezikjian ........ B64D 11/0696 |
| | | 297/452.2 |
| 6,669,400  B1 * | 12/2003 | Sergi ....................... F16B 7/182 |
| | | 403/379.3 |
| 2017/0298967  A1 * | 10/2017 | Bianchi ................ B62K 15/006 |
| 2019/0135374  A1 * | 5/2019 | Heyder .................. B62K 23/06 |
| 2020/0056638  A1 * | 2/2020 | Bianchi .................. B25B 5/103 |

FOREIGN PATENT DOCUMENTS

| JP | S49-58421  A | 6/1974 |
| JP | S60-23610  A | 2/1985 |

* cited by examiner

[Fig. 1]
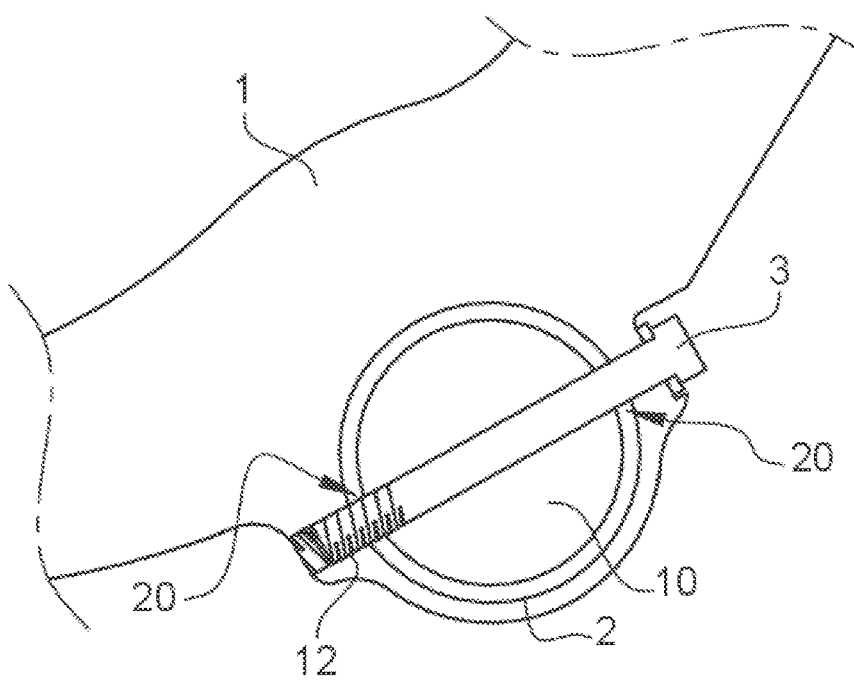
[Fig. 2]
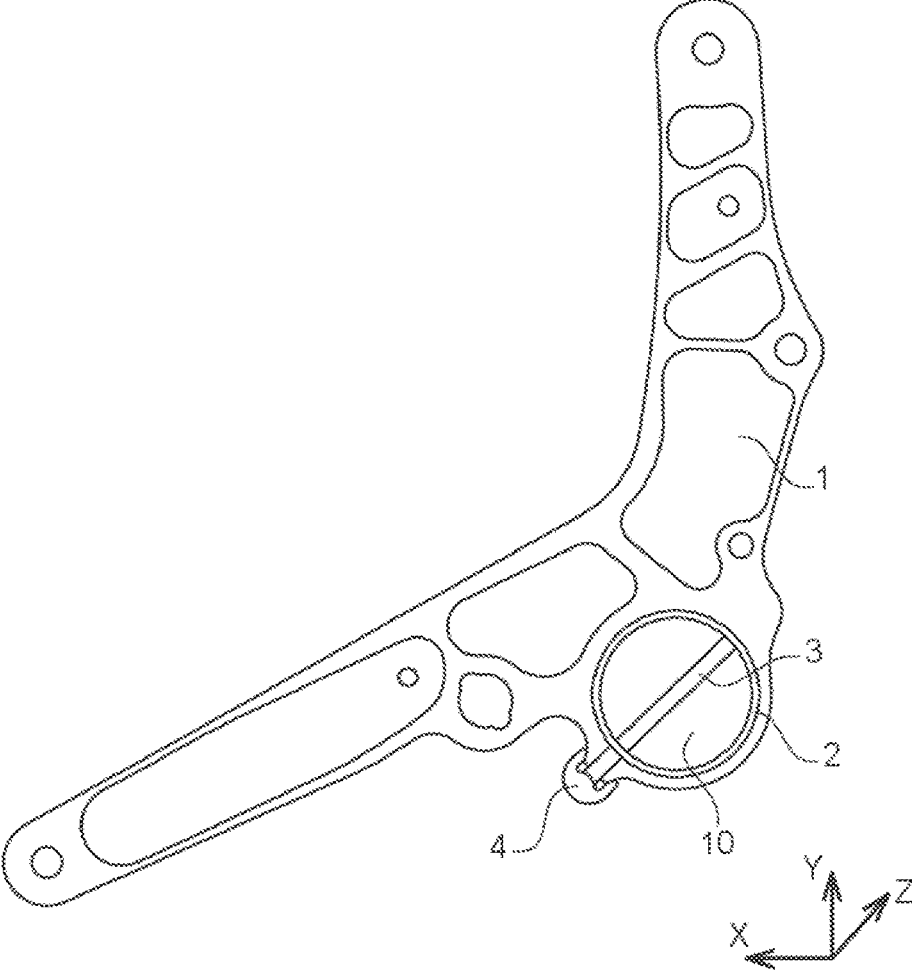

[Fig. 3]
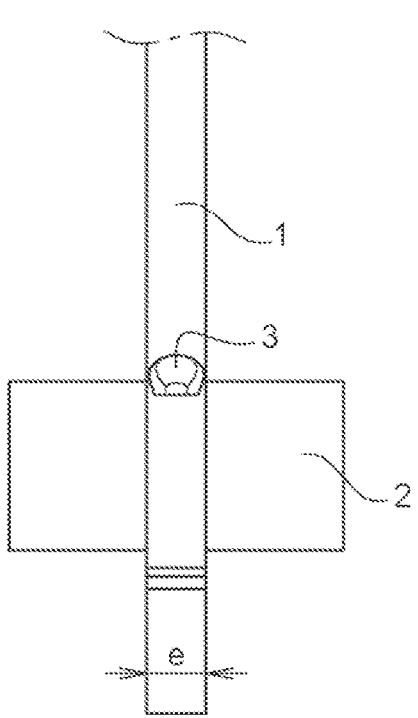
[Fig. 4]
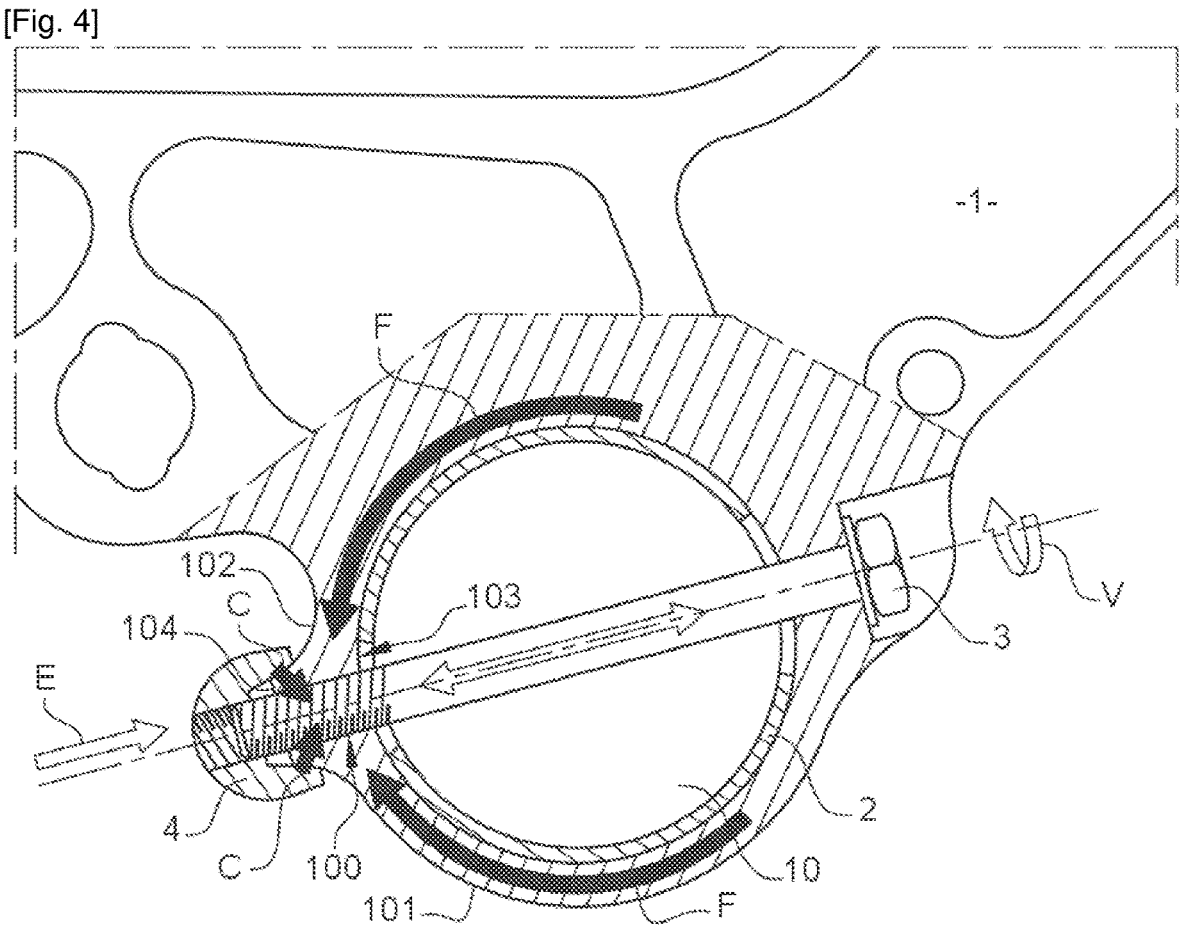

[Fig. 5]
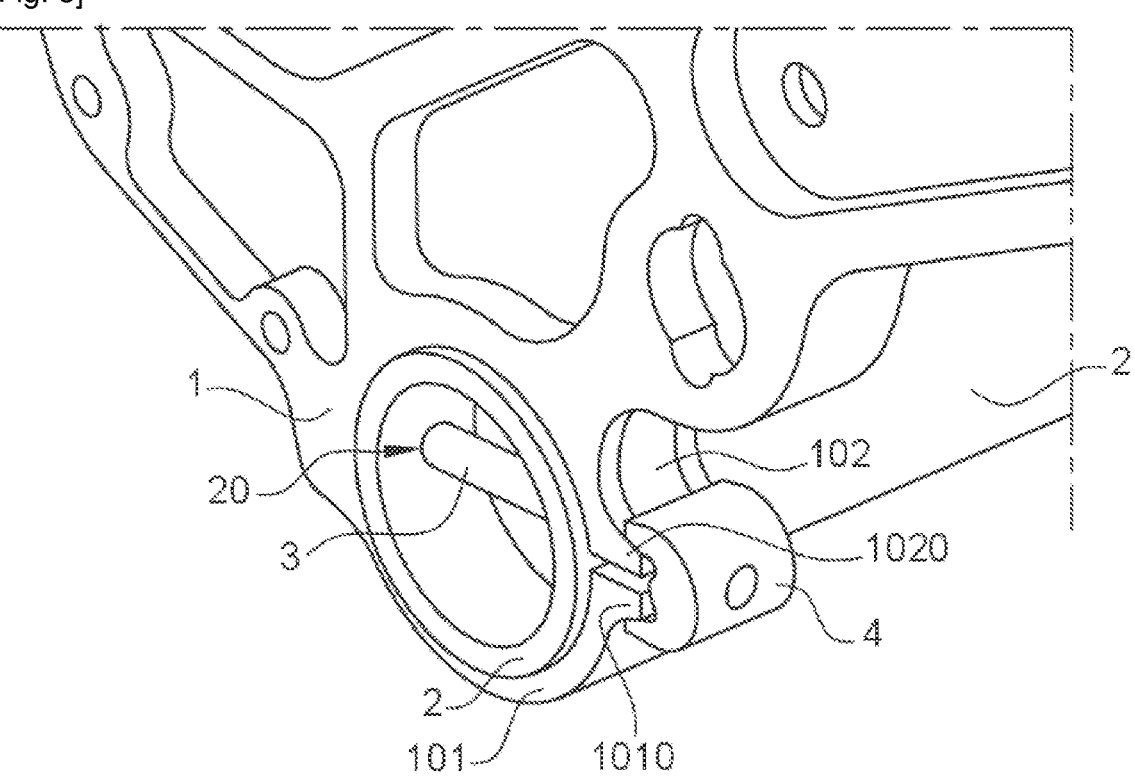
[Fig. 6]
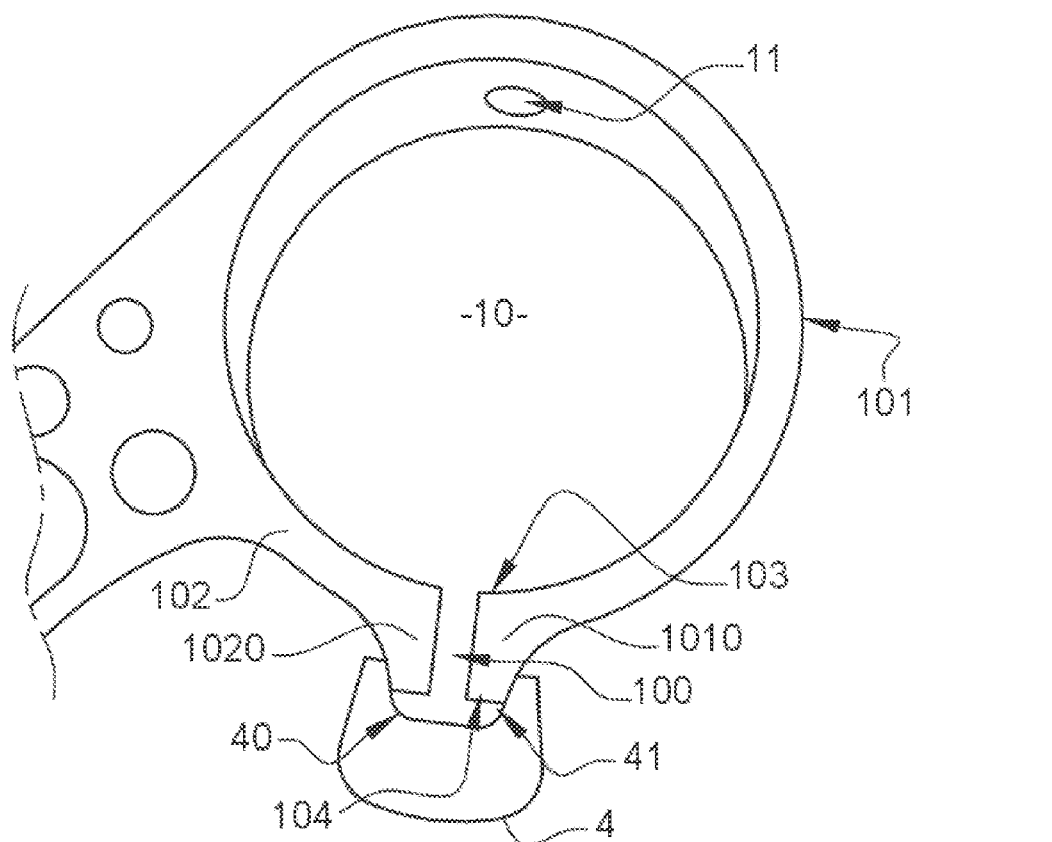

[Fig. 7]
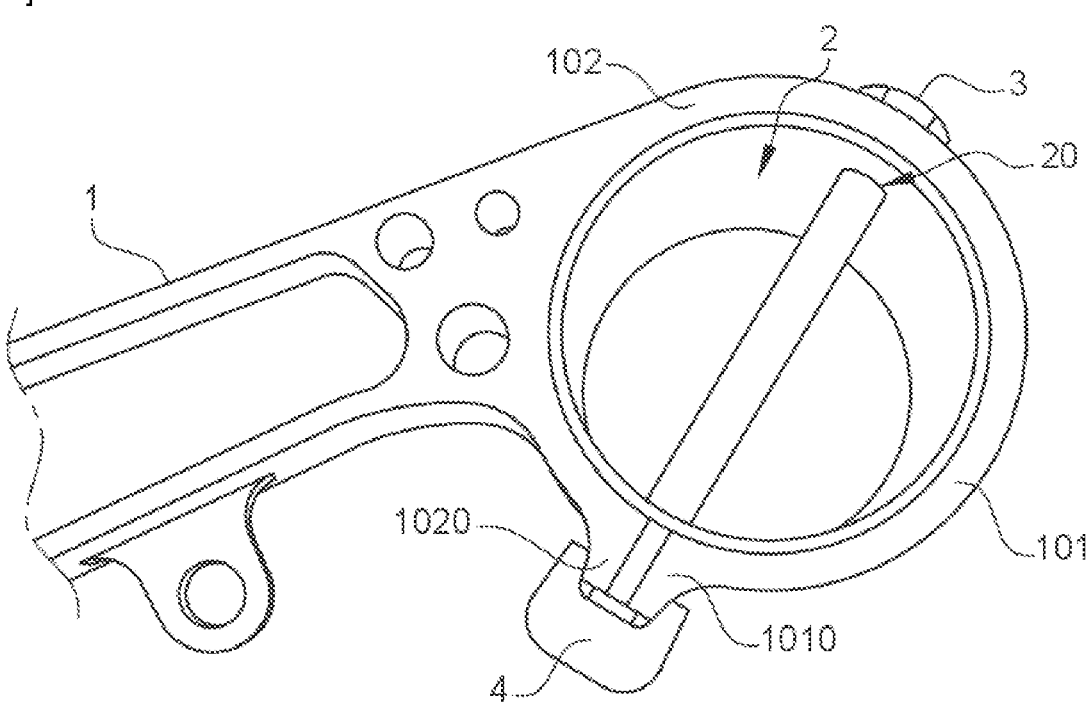

DEVICE FOR ATTACHING A TUBE ONTO A HOLDER

CROSS-REFERENCE TO RELATED APPLICATIONS

This application is the U.S. National Stage of PCT/FR2021/052057, filed Nov. 22, 2021, which in turn claims priority to French patent application number 2012416 filed Nov. 30, 2020. The content of these applications are incorporated herein by reference in their entireties.

TECHNICAL FIELD OF THE INVENTION

The technical field of the invention is that of attachment devices and more particularly attachments between a tube and a holder, this holder could, for example, be a bracket of an airplane seat structure.

TECHNOLOGICAL BACKGROUND OF THE INVENTION

Attaching cylindrical beams or tubes onto holders, whether metal or not, is made by tightening a simple screw passing through these two elements. The screw therefore only exerts pressure at its head and its threads, which has the effect of "pinching" the holder around the tube and does not distribute the tightening over the entire periphery thereof. This simple radial tightening of the tube in the holder induces a poorly distributed pressure on its periphery and thus an ovalisation thereof. This results in a poorly controlled tightening torque as well as squeaking noises when a load is exerted due to the clearances between the tube and the holder induced by this tightening mode. The assembly then loses rigidity and does not ensure optimal load transmission.

This is even more annoying when this attachment relates to a seat where squeaking noises occur when a user sits downs or handles the seat.

SUMMARY OF THE INVENTION

The invention offers a solution to the problems previously discussed, by allowing better distribution of forces over the entire periphery of the tube and thus improving rigidity of the attachment.

The device for attaching a tube onto a holder according to the invention comprises the tube, the holder, a through screw and a nut, the holder receiving the tube in a cylindrical housing transversely pierced by a port, the tube having two piercings facing each other, the screw passing through the port and the two piercings and securing the tube and the holder, it is characterised in that the cylindrical housing of the holder has a longitudinal slot facing the port, the slot having two inner edges disposed on the side of the housing and two outer edges disposed on the side opposite the housing, the nut including at least one inclined face, each outer edge having a bell crank cooperating with the inclined face of the nut. The tightening of the screw to the nut causes the edges of the slot to be tightened to the tube, the cylindrical housing closes on the tube allowing contact of the entire surface of the housing on the surface of the tube and thus better distribution of the loads.

According to a first embodiment, the inclined face is conical. In this case, the nut can be circular and therefore of low overall size. Each bell crank will then be semi-conical in shape.

According to a second embodiment, the nut has two inclined faces facing each other. The two inclined faces provide a bearing surface over the entire thickness of the holder. The bell cranks will then be planar in shape.

Advantageously, the tube and the cylindrical housing have a circular cross-section. A circular cross-section of the tube and the cylindrical housing facilitates mounting of the tube which can be inserted in any position and thus tightening of the cylindrical housing to the tube. However, a tube and housing with an oval cross-section allows the tube to be rotatably blocked.

Advantageously, the holder is metallic. The metal allows a certain flexibility which allows the holder to both deform to enclose the tube and to return to its original shape if the tube has to be removed from the holder.

Advantageously, the tube is metallic. The metal is strong enough while remaining flexible enough.

Advantageously, the tube is of composite material. Composite materials are lighter and stronger and particularly adapted for aeronautical applications.

Advantageously, the holder is a bracket. The holder has a curved shape in the form of a bend and the attachment can be made either at each end or at the bend location.

Advantageously, the bracket constitutes an element of a seat. The seat may for example be an airplane seat.

A seat comprising an attachment device with at least one of the preceding characteristics. In this case, the seat consists of at least two brackets connected by at least one tube, preferably three tubes.

BRIEF DESCRIPTION OF THE FIGURES

The figures are set forth by way of indicating and in no way limiting purposes of the invention.

FIG. 1 is a cross-section view of a device for attaching a tube in a holder according to the state of the art;

FIG. 2 is a side view of a holder with an attachment device according to the invention;

FIG. 3 is a rear view of FIG. 2;

FIG. 4 is a partial cross-section view of the side of the device according to the invention;

FIG. 5 is a perspective view of a device according to the invention;

FIG. 6 is a side view of another holder with a nut;

FIG. 7 is a side view of the holder of FIG. 6 with the screw, the nut and the tube.

DETAILED DESCRIPTION

The figures are set forth by way of indicating and in no way limiting purposes of the invention.

Unless otherwise specified, a same element appearing in different figures has a single reference.

Throughout the description, the plane XY illustrated in FIG. 1 will be referred to as the "side", the front being disposed on the left-hand side of this figure.

The attachment device of the state of the art of FIG. 1 comprises a holder 1, a tube 2 and a screw 3. The tube 2 is inserted into a cylindrical housing 10 provided for this purpose in the holder 1 of thickness e. A screw 3 secures the whole by passing through the tube 2 via two piercings 20 facing each other, and the holder 1 via a port 11 and a threaded hole 12.

This simple screw therefore only exerts pressure at its head and its threads, which has the effect of "pinching" the holder around the tube and does not distribute tightening over the entire periphery thereof. It can be seen here that the connection only holds at the two piercings 20, resulting in significant stresses at this location which can deform the tube 2. This deformation, an ovalisation of the tube 2, results in a poorly controlled tightening torque, clearances between the tube and the holder induced by this tightening mode, the assembly then loses rigidity and therefore does not ensure optimal load transmission.

On the tightening device according to the invention illustrated in FIGS. 3 to 5, the holder 1 comprises a cylindrical housing 10 with a longitudinal slot 100 which divides the housing 10 into two legs 101 and 102. Here, the leg 101 is flexible so that it can close over the other leg 102. The slot 100 has an inner edge 103 and an outer edge 104.

Each of the two legs 101 and 102 terminates in a bell crank 1010 and 1020, placed projecting from an outer edge 104 of the slot 100. The nut 4 has two inclined faces 40 and 41 intended to cooperate with the bell cranks 1010 and 1020 and inclined towards the threaded part of the nut 4. These bell cranks 1010 and 1020 extend through the entire thickness e of the holder 1. In FIGS. 6 and 7, the two legs 101 and 102 are flexible.

The cylindrical housing 10 also comprises a port 11 facing the longitudinal slot 100 (see FIG. 6). The tube 2 is also drilled with two piercings 20 facing each other.

The nut 4 is in the form of a segment having the length of the thickness e of the holder 1. One of its sides includes two inclined faces 40 and 41. The inclination of the faces 40 and 41 is substantially the same as that of the bell cranks.

The assembly of the tube 2 onto the holder 1 will now described. The tube 2 is introduced into the cylindrical housing 10 of the holder 1, once the piercings 20 face the port 11, the screw 3 is inserted into the port 11, the piercings 20 and the longitudinal slot 100.

Once the screw 3 has been introduced, the nut 4 is screwed onto the end of the screw 3 according to the arrow V. The tightening of the nut 4 will bring the same closer to the bell cranks 1010 and 1020 (arrow E), once its inclined faces 40 and 41 are in contact with the bell cranks 1010 and 1020 (arrow C), the nut 4 being brought closer to the holder will cause the inclined faces 40, 41 to bear on each of the bell cranks 1010 and 1020. The increasingly important bearing of the inclined planes 40, 41 as the nut 4 is tightened will cause the progressive closure of the two legs 101 and 102 until the tube 2 is sufficiently tightened (arrow F).

In the example in FIGS. 6 and 7, the two legs 101 and 102 are flexible, which allows for better tightening of the tube 2.

Other forms of holder or nut are possible, for example a nut with a hollow conical face which cooperates with two half-cones projecting from the outer edges 104 of the slot 100.

This attachment device is particularly well adapted for airplane seats including structural elements, such as brackets and beams. The brackets include a zone for the beam to pass through and the attachment of the whole is performed by means of a screw passing through openings provided in the beam and the bracket. The bracket thus corresponds to the holder and the beam to the tube.

In general, airplane seats include several individual places separated by armrests. Each place is separated from the next by a bracket, thus for example there are four brackets for three places. The brackets are connected to each other by one or more tubes or beams. For example, there may be one tube at the seat base, one at the backrest and one at the intersection of the seat and backrest.

The invention claimed is:

1. A device for attaching a tube onto a holder, comprising the tube, the holder, a through screw and a nut, the holder receiving the tube in a cylindrical housing transversely pierced by a port, the tube having two piercings facing each other, the screw passing through the port and the two piercings and securing the tube and the holder, wherein the cylindrical housing of the holder has a longitudinal slot facing the port, the slot having two inner edges disposed on the side of the housing and two outer edges disposed on the side opposite the housing, the nut including at least one inclined face, each outer edge having a bell crank cooperating with the inclined face of the nut.

2. The attachment device according to claim 1, wherein the inclined face is conical.

3. The attachment device according to claim 1, wherein the nut has two inclined faces facing each other.

4. The attachment device according to claim 1, wherein the tube and the cylindrical housing have a circular cross-section.

5. The attachment device according to claim 1, wherein the holder is metallic.

6. The attachment device according to claim 1, wherein the tube is metallic.

7. The attachment device according to claim 1, wherein the tube is of composite material.

8. The attachment device according to claim 1, wherein the holder is a bracket.

9. The attachment device according to claim 8, wherein the bracket is a component of a seat.

10. A seat comprising an attachment device according to claim 1.

\* \* \* \* \*